(12) United States Patent
Tilly et al.

(10) Patent No.: US 12,165,200 B1
(45) Date of Patent: Dec. 10, 2024

(54) ORDER TRACKING AND VISUALIZATION

(71) Applicant: Cboe Exchange, Inc., Chicago, IL (US)

(72) Inventors: Edward T. Tilly, Chicago, IL (US); Robert Hocking, Downers Grove, IL (US)

(73) Assignee: Cboe Exchange, Inc., Chicago, IL (US)

(*) Notice: Subject to any disclaimer, the term of this patent is extended or adjusted under 35 U.S.C. 154(b) by 53 days.

(21) Appl. No.: 17/719,070

(22) Filed: Apr. 12, 2022

Related U.S. Application Data

(60) Provisional application No. 63/174,901, filed on Apr. 14, 2021.

(51) Int. Cl.
*G06Q 40/04* (2012.01)
(52) U.S. Cl.
CPC .................................. *G06Q 40/04* (2013.01)
(58) Field of Classification Search
CPC ...................................................... G06Q 40/04
See application file for complete search history.

(56) References Cited

U.S. PATENT DOCUMENTS

| | | | | |
|---|---|---|---|---|
| 7,613,650 | B2* | 11/2009 | Smith | G06Q 40/04 705/37 |
| 2006/0069636 | A1* | 3/2006 | Griffin | G06Q 40/00 705/37 |
| 2009/0083614 | A1* | 3/2009 | Wedekind | G06F 40/18 715/217 |
| 2013/0204765 | A1* | 8/2013 | Koh | G06Q 40/04 705/37 |
| 2020/0242122 | A1* | 7/2020 | Beuch | G06F 16/24578 |
| 2021/0152491 | A1* | 5/2021 | Sun | H04L 43/20 |
| 2021/0272197 | A1* | 9/2021 | Inzirillo | G06F 9/542 |

* cited by examiner

*Primary Examiner* — Elda G Milef
(74) *Attorney, Agent, or Firm* — Fish & Richardson P.C.

(57) ABSTRACT

Methods, systems, and apparatus, including medium-encoded computer program products, for tracking and visualizing an order are described. An exchange computer system (ECS) can receive an order from a user, generate an order and tag the order with the order identification. The ECS can transmit data to the user that causes a graphical user interface (GUI) to display tracking status. The ECS can conduct an operation associated with the order, and a stage of order execution can be determined. The order execution stages can vary based on a type of the order. Data indicative of the stage of the order execution and the order identification can be obtained in response to receiving the request for information indicative of the order status of the order. The ECS can transmit data that causes a GUI to display the order status that indicates the stage of the order.

20 Claims, 13 Drawing Sheets

ORDER TRACKING AND VISUALIZATION

CROSS-REFERENCE TO RELATED APPLICATION

This application claims priority from and the benefit of U.S. Provisional Pat. App. No. 63/174,901, filed Apr. 14, 2021, which is incorporated by reference in its entirety.

FIELD

This application relates to user interfaces for tracking and visualizing orders.

BACKGROUND

High volumes of financial instruments, such as derivatives, stocks, and bonds, are continuously traded in real time at electronic exchanges through algorithmic processing of orders and associated market information and through open outcry trading. Given the large volume of transactions and variety in the details of each transaction, it can be difficult for market participants to keep track of orders.

SUMMARY

This specification describes advancements in systems, methods, and other implementations related to tracking and visualizing transactions involving financial instruments, such as derivatives, stocks, and bonds. When users place orders, it is common for the users to want to track the order as it progresses through the fulfillment process. However, tracking the order at various stages and across trading platforms can be challenging. For example, data describing the order can vary across trading platforms, so there is a need to adapt data formats to a common format so order status can be reported. In addition, it is beneficial for a user to track orders through a single platform, rather than requiring the user to retrieve data from multiple platforms, especially since the data is often in different formats, contains different information, and relates to a wide variety of instruments.

Particular implementations of the subject matter described in this specification can be implemented so as to provide an order-tracking interface to enter orders and view order status on a user device. The order-tracking interface can include an order entry interface through which a user can specify and enter orders. A unique identifier can be assigned to the entered order. Thereafter, if the user desires to track the entered order or other orders of interest, the user can invoke an order status interface on the user device through which the user can view an order status and other information related to the order. For example, if the order was placed or filled through an open outcry system, the order status interface can provide an option for the user to view a still or moving image of the order being placed or filled.

An exchange computer system can communicate with the user device to provide user interface presentation data that includes data indicative of an order status. The data indicative of the order status can include a livestream or captured video of the execution of the order. In addition, the techniques described in this disclosure can be used to efficiently capture and store video of order execution by determining the time at which an order occurred, and beginning livestream and/or capture at that time. The techniques can further include data transformations that allow disparate exchange systems to share data. The techniques can further include a machine-learning model that determines the orders in which the user will likely be interested, and displays those orders in a tracking user interface according to the predicted interest. For example, the technique can cause the orders with the highest predicted interest to be displayed most prominently. Such techniques improve the effectiveness of the tracking system The implementations described in this disclosure can provide various advantages and solutions to problems that often exist when executing trades. For instance, some orders can be filled through open outcry trading in which traders in trading pit use verbal and hand signals to communicate the intent to buy and sell instruments such as stocks, options and, futures. The ability to view still and video images (including audio) of an open outcry trading event related to an order can provide both trust and excitement for the transacting party. For example, the image data can be used as a reference to corroborate and to verify details of the order such as time of trade and symbol traded. In another example, a trading pit can be large and multiple cameras can be required to cover the entire trading area. Determining which camera is transmitting the relevant video requires a technical solution.

Moreover, providing order-tracking information in a single platform can involve accepting and reformatting data received in disparate data formats and using different schema. In addition, to avoid wasting computing resources such as network bandwidth and computer processing resources and storage, the system must determine when the relevant transaction occurs to avoid transmitting irrelevant notifications and data to the customer. Further, to allow a customer to follow the progress of a prior order requires efficient storage and retrieval of the relevant open outcry video.

According to some aspects, a method for tracking and visualizing an order associated with a financial instrument features is disclosed. The method includes receiving, over a computer network coupled to an exchange computer system, an order from a user device. A processor of an exchange computer system can generate an order identification in response to receiving the order and tag the order with the order identification. A transceiver of the exchange computer system can transmit to the user device over the computer network, data that causes a graphical user interface of an application running on the user device to display a first tracking status. The processor can conduct an operation associated with the order. From among a plurality of order execution stages, a stage of order execution associated with the order can be determined in response to conducting the operation. The order execution stages can vary based on a type of the order. Data indicative of the stage of the order execution and the order identification can be stored in an order tracking storage device. From the order tracking storage device and by the processor, the data indicative of the stage of the order execution and the order identification can be obtained in response to receiving the request for information indicative of the order status of the order. The transceiver can transmit to the to the user device over the computer network, data that causes a graphical user interface of an application running on the user device to display the order status that indicates the stage of the order execution.

One or more of the following features can be included in the method. The exchange computer system can include an order routing system, an order matching system, and an order-tracking engine. The order routing system can determine that the exchange computer system is the order destination. The order can be forwarded from the order routing system to the order matching system. The order matching system can facilitate a transaction based on the order, one or more responses to the order, and one or more order matching rules. The order-tracking engine can determine that the order has been executed in response to completion of the transaction.

An instruction to fulfill the order through open outcry trading can be received from a user device. Fulfillment data that represents fulfillment of the order through open outcry trading can be captured. The fulfillment data can be associated with the order. The fulfillment data can include a video of the fulfillment of the order through open outcry trading. Data can be transmitted to the user device that causes the graphical user interface of the application to display a live view of an open outcry trading floor associated with exchange computer system. Fulfillment data can be stored and in response to a request from the user device, the fulfillment data can be provided. The capturing can begin in response to receiving the instruction to fulfill the order through open outcry trading, and the capturing can cease in response to receiving an indication that the order has been fulfilled. The order can include a symbol associated with the financial instrument, an order type, and an order amount. The order identifier can include at least one of (i) an order type, (ii) a user, or (iii) a serial number. The order identifier can be encoded as an error correcting code.

Other implementations of this aspect include corresponding systems, devices, processes, apparatus, computer-readable media, and computer programs recorded on computer storage devices, each configured to perform the operations of the methods.

The details of one or more implementations of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
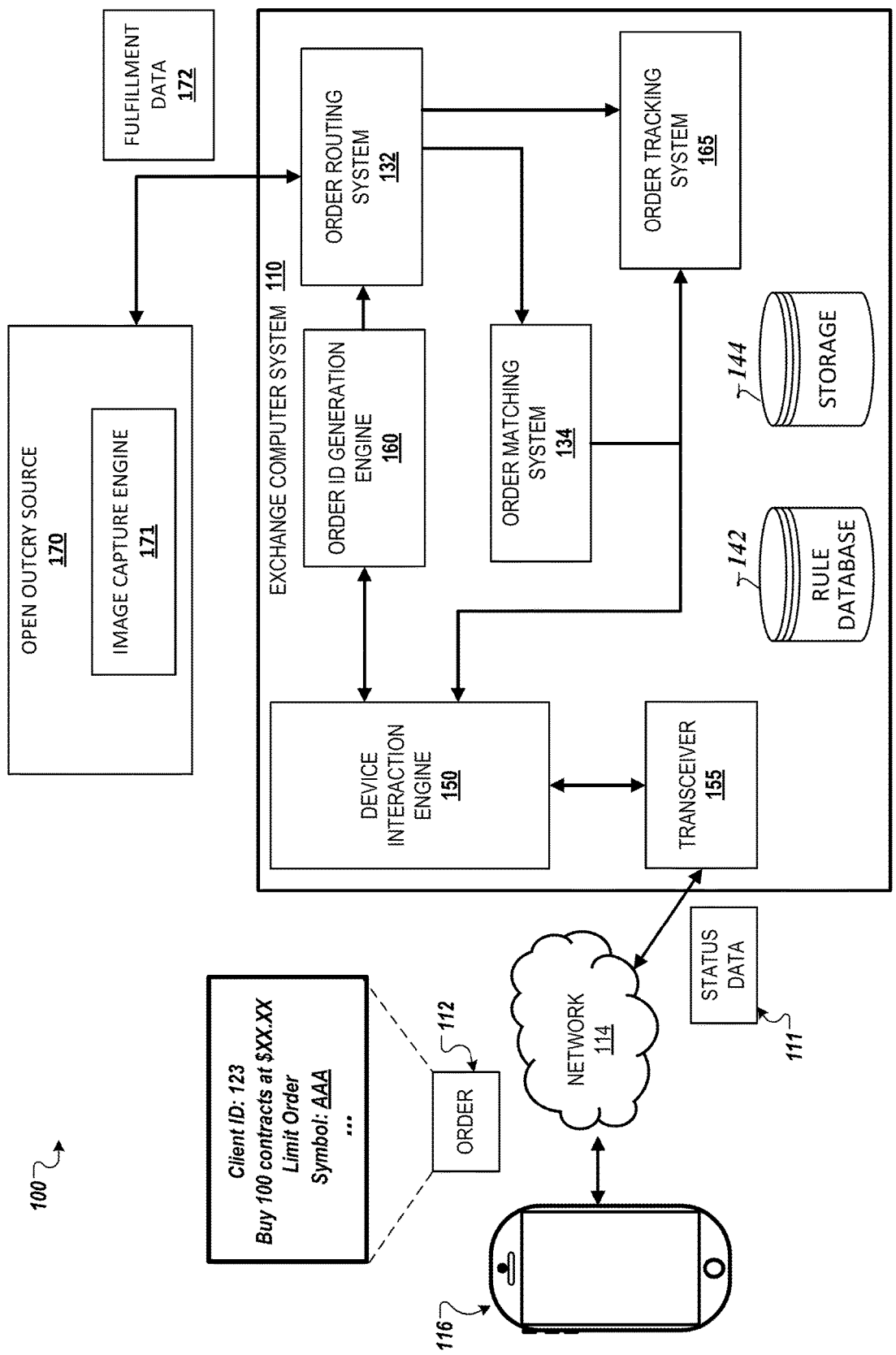
FIG. 1 shows an example of an environment for order visualization created by an exchange computer system.

FIG. 1 is an example of an environment 100 for order visualization that includes an exchange computer system and the associated networks, devices. The environment 100 includes an exchange computer system 110, a network 114, an open outcry source 170, and a user device 116. Although only one open outcry source 170 and one user device 116 are shown in FIG. 1, the environment 100 may include multiple open outcry sources 170 and user devices 116. Generally, the term "user" can refer to any entity that interacts with the exchange computer system and/or associated networks and devices. Users can include, for example, market makers, market participants, brokers, institutional traders, individual traders, and automated trading systems.

In some cases, a user can refer to a member, as defined under exchange rules, or a clearing member, who is a member of a Qualified Clearing Agency authorized to clear transactions on behalf of another member, as defined under exchange rules. If a clearing member is the user, the clearing member can be required to request authorization from the exchange computer system 110 to receive data indicative of a current or previous risk profile setting of the member on behalf of whom the clearing member is acting.

The exchange computer system 110 can be implemented in a fully electronic manner, or in a hybrid manner that combines electronic trading with aspects of traditional open-outcry systems. The exchange computer system 110 can receive orders for trading financial instruments locally on the floor and from remote electronic devices. The financial instruments can include securities such as stocks, options, futures, or other derivatives associated with an underlying asset.

The orders received and processed by the exchange computer system 110 can include conditional orders and firm orders. Conditional orders are orders to buy or sell a financial instrument when conditions specified by the user are satisfied. Conditional orders can include limit orders and stop orders. A limit order is an order to automatically buy or sell a financial instrument at a maximum bid price to be paid or at a minimum offer price to be received, as specified by the user. A stop order is an order to buy or sell when the financial instrument's market price has reached or surpassed the user's requested price. Limit orders and stop orders can be placed above and below the market price. In contrast to conditional orders, a firm order is an order placed on behalf of a firm (rather than a firm's client) and is not dependent upon a later confirmation by the client or conditions set by the client.

Network 114 connects the various components within the trading environment, and is configured to facilitate communications between those components. For example, network 114 can enable the exchange of electronic communications that include order and order fulfillment data between connected devices, such as an electronic order book and the exchange computer system 110.

Network 114 can include one or more networks or sub-networks, each of which can include a wired or wireless data pathway. Network 114 can, for example, include one or more of the Internet, Wide Area Networks (WANs), Local Area Networks (LANs), or other packet-switched or circuit-switched data networks that are capable of carrying electronic communications (e.g., data or voice communications).

In some implementations, the network 114 can include a communications network inclusive of hardware and software implemented on various systems, devices, and components connected to network 114. In some implementations, trader information, such as a trader's speech and actions, can be recorded by a user device (e.g., a computer or portable device such as a cellular phone) at the location of the trader using sensors, cameras and microphones, and can be continuously transmitted across the network 114 to other devices connected to the network 114.

To protect communications between the various systems, devices, and components connected to network 114, network 114 can implement security protocols and measures such that data identifying order or bid information, or parties placing orders or quotes, can be securely transmitted. Network 114 can, for example, include virtual private networks (VPNs) or other networks that enable secure connections to be established with exchange computer system 110.

User device 116 can include a portable or stationary electronic device, such as a smartphone, laptop, desktop, and server that includes one or more user interfaces to display information and receive user input, and that are configured to communicate over a computer network. User device 116 can communicate with the exchange computer system 110 over network 114 using a proprietary protocol, or a message-based protocol such as financial information exchange (FIX), implemented over TCP/IP. The user device 116 can include or be coupled to one or more user interfaces such as a keyboard, mouse, or display device through which user input, such as user selections, can be received. For example, a display device in a user device 116 can be configured to display a web portal or graphical user interface through which a user can provide input related to a conditional order.

User device 116 can transmit user input such as order information 112, including any conditional orders, to the exchange computer system 110, and can also receive status data 111 from the exchange computer system 110 indicating the status of an order, e.g., that an order has been filled or canceled. The order status 111 can be conveyed in various suitable ways including, for example, in the form of a report providing details of a trade or cancellation. The details in the status information 111 can include one or more of the parties or firms involved, the financial instrument being traded, the price and quantity of the trade, the time at which the trade was completed or canceled, and the venue of the exchange at which the trade was executed or canceled. In some implementations, one or more details of the status information 111 can be sanitized or anonymized such that the one or more details (e.g., parties involved in the trade, or volume traded) of the report are omitted from the report. The order can include, but is not limited to, an identifier of the client placing the order, a symbol (or other identifier) for the instrument, the order type, and the order amount.

Users, such as brokers/market makers or participants, can also place orders 112 and receive information about order fulfillment or termination through an electronic order book, which can include a record of outstanding public customer limit orders that can be matched against future incoming orders.

The exchange computer system 110 can include a device interaction engine 150, a transceiver 155, an order identification (ID) generation system (160), an order tracking system 165, an order routing system (ORS) 132, an order matching system (OMS) 134, a rules database 142 and storage 144. The exchange computer system 110 can be integrated at a single location or a single device, e.g., in the form of a server (as described in more detail in reference to FIG. 13), or can be distributed over a wired or wireless computer system.

The device interaction engine 150 can provide to user device 116 data relevant to a user's interactions with the exchange computer system 110. For example, the device interaction engine 150 can provider user interface presentation data, which, when rendered by the user device 116, causes the user device 116 to present data relevant to the interaction. In addition, when a user interacts with the user interface presentation data, for example, by providing text in a text field specified by the user interface presentation data, the user interface presentation data can cause the information provided by the user to be transmitted to the device interaction engine 150.

The device interaction engine 150 communicates with user devices 116 over a network 114 using one or more transceivers 155 included in the exchange computer system 110. The one or more transceivers 155 can be hardware devices configured to transmit and to receive data over a network. The transceivers 155 can be connected to one or more networks 114, including wired and wireless networks. The combination of the device interaction engine 150 and transceiver 155 can serve as an order entry point, as described further below.

The order routing system (ORS) 132 can determine whether a received order 112 or quote is to be executed at the exchange computer system 110, or should instead be redirected to another exchange. The ORS 132 can include or be coupled to processing systems that enable the management of high data volumes and one or more order entry points that are configured to receive order or quote information for the purchase or sale of financial instruments from one or more user devices 116. In some implementations, the ORS 132 can also be connected to or include a touch-screen order routing and execution system accessible by brokers on the exchange floor, such as a public automated routing (PAR) system.

Upon receiving an order 112 or quote, the ORS 132 can determine if the destination specified in the received order or quote is the exchange computer system 110. If the exchange computer system 110 is not the destination, the ORS 132 forwards the order or quote to another exchange, which can be either the destination exchange or an exchange en route to the destination exchange.

If the ORS 132 determines that the exchange computer system 110 is the destination of the received order 112 or quote, the ORS 132 can forward the received order 112 or quote to the order matching system 134. The ORS 132 can include or be coupled to a transceiver 155 that receives the order and forwards the received order to the order matching system 134. In some implementations when processing conditional orders, the ORS 132 is configured to route a conditional order according to a destination associated with the first conditional order.

The order matching system (OMS) 134 includes processing systems that analyze and manipulate orders according to matching rules stored in the database 142. The OMS 134 can also include an electronic book (EBOOK) of orders and quotes with which incoming orders to buy or sell are matched, according to the matching rules. The EBOOK can also be implemented in a separate database such as storage 144, which can include multiple mass storage memory devices for the storage of order and quote information. When the OMS 134 determines that a match exists for an order (for example, when a bid matches an offer for sale), the order matching system 134 can mark the matched order or quote with a broker-specific identifier so that the broker sending the order or quote information can be identified.

Upon completion of a trade (e.g., through the floor in open outcry 170 as entered into the PAR system, or through automatic execution through the OMS 134), fulfillment data 172 is passed through OMS 134 and ORS 132 to one or more user devices 116, and to a continuous trade match (CTM) system. The fulfillment data can include, without limitation, information about the trade (e.g., order number, trade price, trade amount, execution date, buyer, among other descriptive fields) and image data, as described further below.

The fulfillment data 172 can further be provided to the order tracking system 165 where it can be retained in storage 144. The CTM system can match the buy side and sell side of a trade, and can forward the matched trade to a third party organization that verifies the proper clearance of the trade, such as the Options Clearing Corporation (OCC) where the securities can be options, or the Depository Trust Company (DTC) where the securities can be equities. The OMS 134 can also format the quote and sale update information and sends that information through an internal distribution system that refreshes display screens on the floor, in addition to submitting the information to a quote and trade dissemination service such as, in the case of options, the Options Price Reporting Authority (OPRA). In the case of equities, the information would be submitted to the Securities Information Processor (SIP).

The open outcry source 170 can be a system configured to capture order placement and fulfillment data that describes the fulfillment of an order by open outcry. The open outcry source can include a combination of hardware (e.g., server, storage and networking hardware) and software and can include an image capture engine 171 that captures video of an open outcry session.

The image capture engine 171 can include a combination of hardware (e.g., server, storage and networking hardware) and software configured to capture images of open outcry trading. The hardware can include one or more cameras, which can include (without limitation) cameras capable of capturing 2D images and 3D images of various resolutions such as high definition and ultra-high definition, one or more microphones and computer hardware and software configured to capture, store, process and route image data (which can include audio). The image capture engine 171 can further include a timer that can provide time stamps for events that occur at the open outcry source 170. In addition, the image capture engine 171 can include an image modification component capable of altering still and video images. For example, the image modification component can enhance privacy by detecting and obscuring faces and other identifying features for persons captured in the images. As described above, the image data can include both still and video images and can include audio data.

The image capture engine 171 can be coupled (e.g., through a wired to wireless network) to one or more camera capable of capturing and transmitting still and video image data, which can also include audio data of the open outcry session. The image capture engine 171 can transmit live video of an open outcry session (e.g., by streaming the live video using HTTP Live Streaming (HLS) protocol) to the exchange computer server 110, to one or more user devices 116, to other exchanges servers, and to other computers configured to receive the video. In addition, the image capture engine 171 can store the captured video on a storage system, and the image capture engine 171 can provide the stored video upon receiving a request (e.g., an HTTP GET message). The image capture engine 171 can include an API that allows other systems (e.g., the exchange computer system 110) to request that video capture begin, that video capture end, that captured video be associated with an order (e.g., the image capture engine 171 can store the order number and a reference to the captured video in a row of a database table).

In some implementations, the image capture engine 171 can stream, capture, and/or store video of multiple open outcry trading sessions. The image capture engine 171 can provide an API that allows other parties (e.g., users or computer systems) to request a segment of video based on a time range. For example, the image capture engine 171 can receive a request for the captured video for a period of 1 pm to 1:10 pm local time. The image capture engine 171 can respond by providing the video of that period. The image capture engine 171 can further include a voice recognition engine that can recognize words and phrases within the captured video. The voice recognition unit can be, for example, the DeepSpeech voice recognition engine.

In some implementations, the image capture engine 171 is coupled to multiple video cameras. In response to a request made through an API provided by the image capture engine 171, the image capture engine 171 can provide data from all cameras, from the camera directed to the open outcry area at which a specified order was places or filled, data from cameras specified in an API request, or any combination of cameras.

Figure 2:
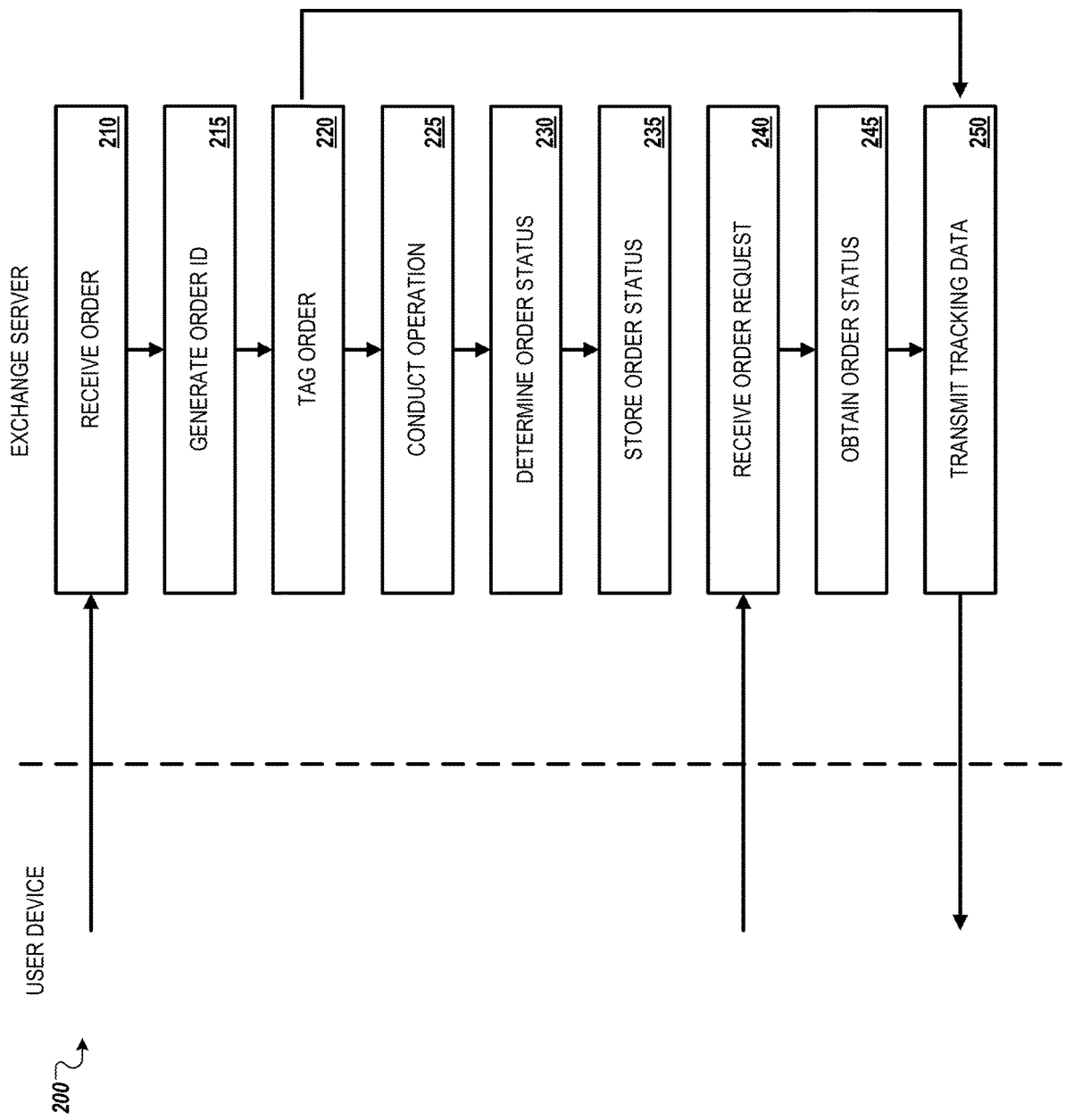
FIG. 2 shows a process for order visualization created by an exchange computer system.

The order tracking system 165 can obtain information about orders 112 and their status as the orders 112 progress through various stages, as described further in reference to FIG. 2. The order status can include the processing stage of the order, and stages can include, for example, submitted, received by broker-dealer, sent to trading venue, entered in order book, cancelled, fulfilled, and so on. The order tracking system 165 can store the status information in storage 144 as part of an order record or store the status information and create an association (e.g., a reference) between the order and the status information.

The order record and the status can be stored, for example, in a table in a relational database where the order record can be a database record. In some implementations, the database record can include a status field and a reference (e.g., an index value) to a second database table that contains information about the order, such as the order type, order amount, client, exchange, order submission time among many other examples. In some implementations, the database record and the status information can be stored in different tables, and status information can be linked to the order record, e.g., by containing a common identifier value.

The order identification generation engine 160 can create an identifier for each order. Order identifiers can include alphanumeric characters and other tokens (e.g., hyphens, ampersand signs and percent signs), and are of a length sufficient to identify all orders processed by the system (which can reach billions or more). Order identifier can be assigned sequentially or can include a structure. For example, various portions of the identifier can encode: (i) the order type, (ii) the user, (iii) the serial number, and so on. Order identifiers can be unique, for example, by including serial number that ensure the order number is unique. To ensure correctness, the order identifier can include a checksum or other error detection component. The order identification generation engine 160 can tag an order with an order identification by adding an order identifier to an order received through the device interaction engine 150 and provide the order with an order identifier to the order routing system 132.

Storage 144 and rule database 142 store and handle data in a manner that satisfies the privacy and security requirements of the exchange computer system 110 and its users, and can store one or more of telemetric data, user profiles, user history, and rules and algorithms for matching quotes, bids, and orders.

Rules database 142 can store data that specifies the rules by which the exchange computer system 110 can operate, as well as specific rules for processing conditional orders. For example, rules database 142 can include rules identifying the type of conditions that can be applied to an order and how a market participant can be scored upon the completion or failure of a conditional order.

FIG. 2 shows a process for order visualization. For convenience, the process 200 will be described as being performed by an exchange computer system, e.g., the exchange computer system 110 of FIG. 1. Operations of the process 200 can also be implemented as instructions stored on one or more computer-readable media, which can be non-transitory. Execution of the instructions by one or more data processing apparatus can cause the one or more data processing apparatus to perform the operations of the process 200.

The exchange computer system receives (210) an order. In some implementations, the exchange computer system can receive the order from a network coupled to the exchange computer system. For example, the exchange computer system can include a web server, and the order can be included in a Hypertext Transfer Protocol-Secure (HTTP-S) message received by the web server.

Figure 3:
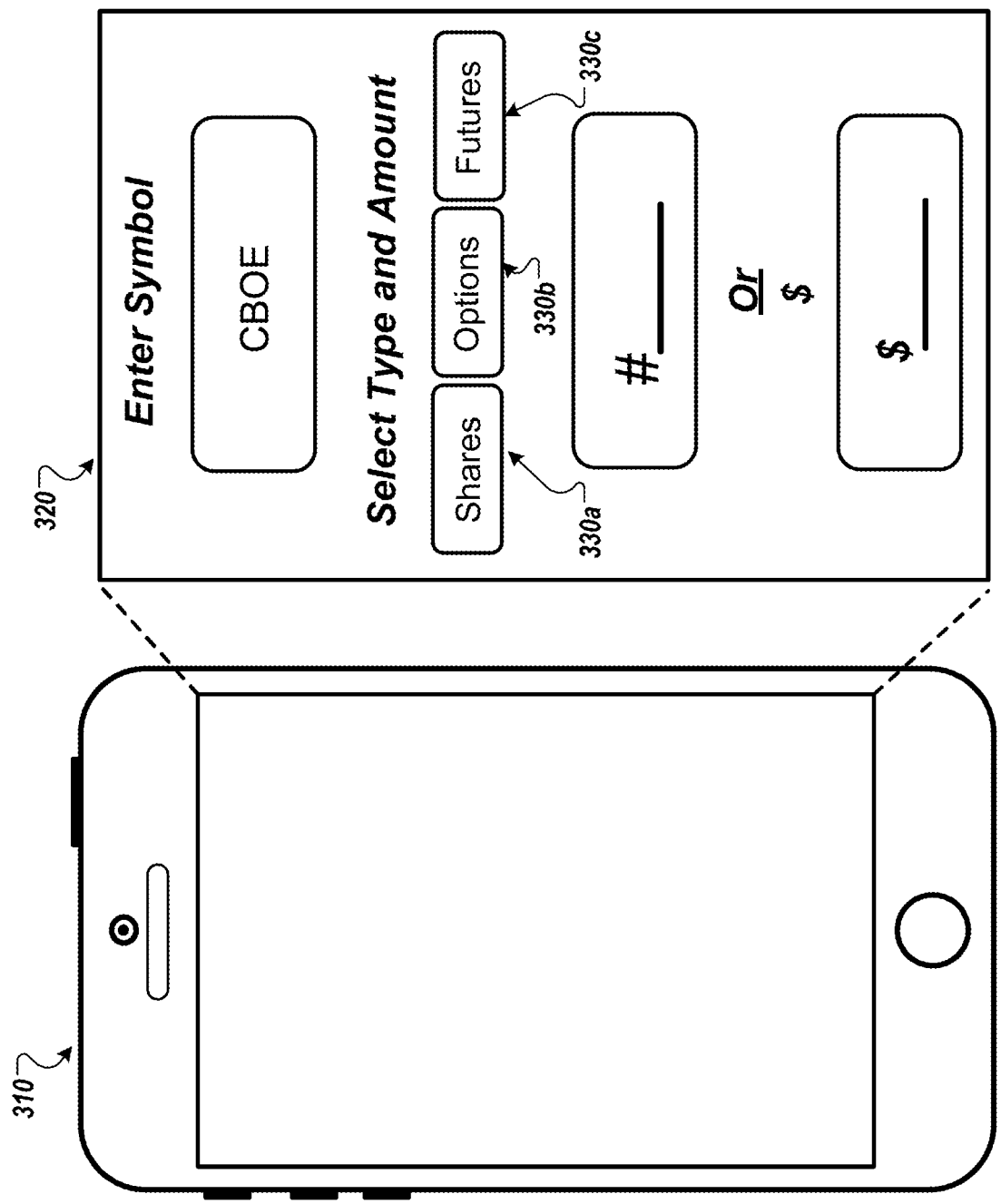
FIGS. 3-5 are illustrations of user interfaces for order submission.

The exchange computer system can receive the order in response to a user interacting with user interface presentation data provided to a user device by the exchange computer system. For example, FIG. 3 is an illustration of a user interface for order submission. The user interface can be displayed by a client device after receiving user interface presentation data from the exchange computer system. A user of a device 310 can interact with a user interface panel 320 created by the user device 310 after receiving user interface presentation data from the exchange computer system. The panel 320 can include fields that enable a user to enter a symbol (e.g., a stock symbol), select the type of the trade and specify an amount. In general, various suitable types of panels 320 can be used to enter order information and additional information from a user. When a user selects a selected type 330a, 330b, 330c by interacting with the user interface presentation data, the user interface presentation data can provide the user with other options. For example, selecting "Options" 330c can cause the user device present the user with the ability to select "Call" or "Put" types, or a strategy type, such as a spread.

Figure 4:
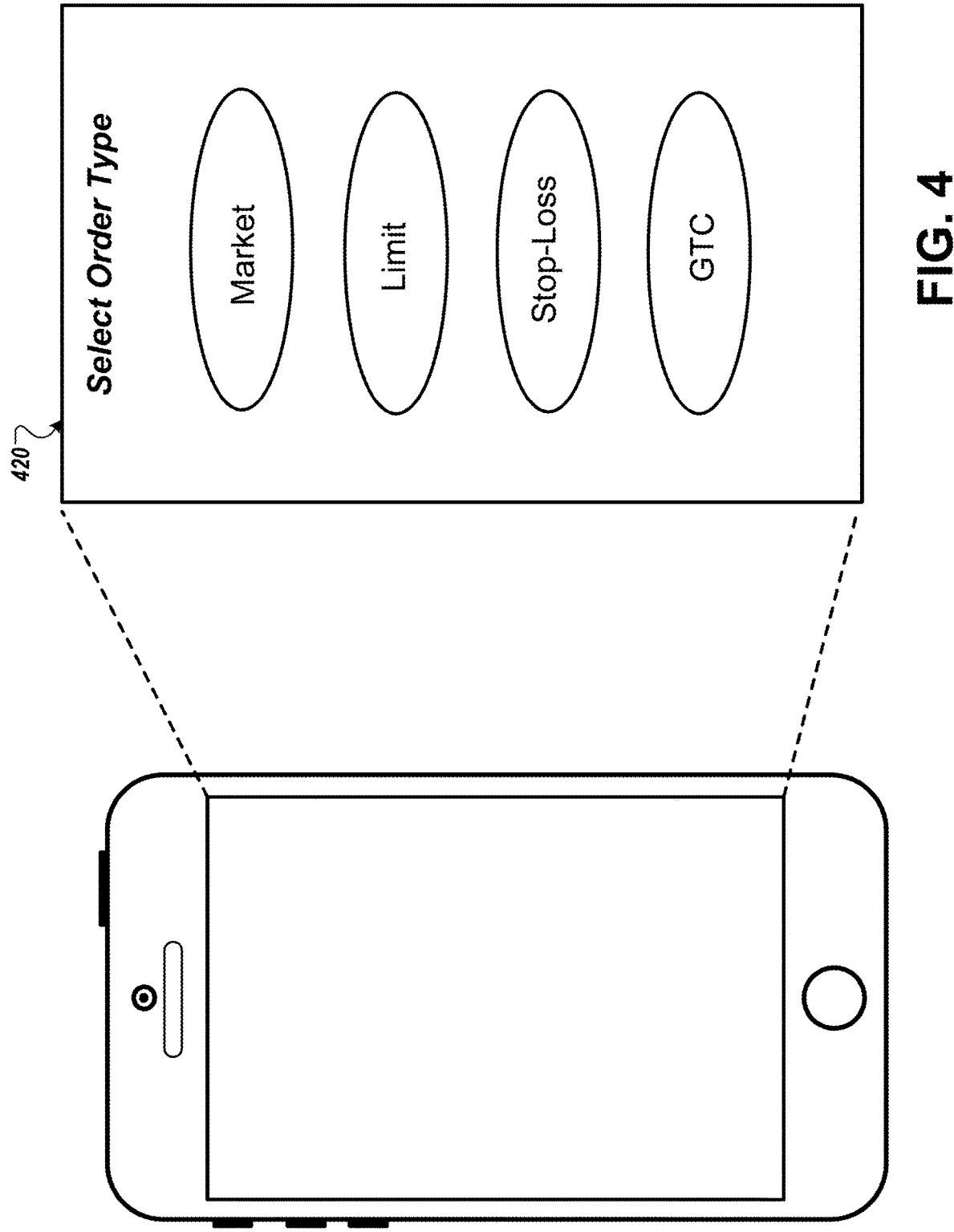

FIG. 4 is an illustration of a second user interface for order submission that includes a panel 420 that allows a user to select a type of order. In FIG. 4, the types include market, limit, stop-loss and GTC. Although only four options are shown in FIG. 4, in general, the panel 420 can display user selectable icons corresponding to various types of orders.

Figure 5:
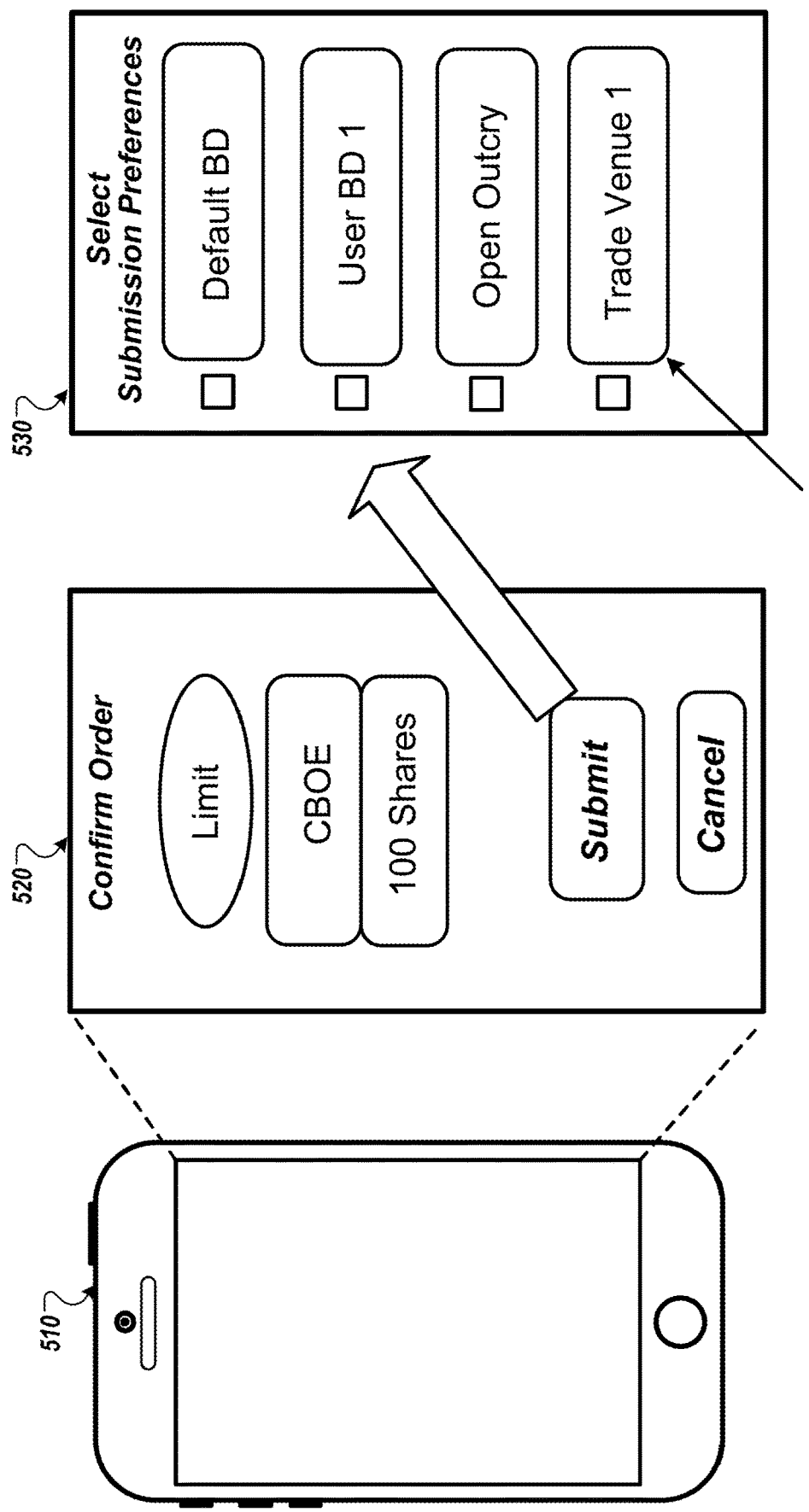

FIG. 5 is an illustration of a third user interface for order submission that includes a panel 520 that can be displayed on a user device 510 and allows a user to review and submit the order. The panel 520 shows an order type of limit, a symbol (e.g., "Cboe") and 100 shares. It further includes a "submit" button, which, when pressed, causes the user interface presentation data for user interface to display a second panel 530. The panel 520 can further include a "cancel" button, which, when pressed, causes the user interface presentation data for user interface to close the panel 520 and display the previously displayed panel.

In the second panel 530, the user can interact with the user interface presentation data to select submission preferences. In FIG. 5, these preferences include default BD (broker-dealer), user BD, open outcry and trade venue 1. Although only four options are shown in FIG. 5, in general, the panel 530 can display user selectable icons corresponding to various types of submission preferences.

Returning to FIG. 2, the exchange computer system generates (215) an order ID. As described above, the order ID can take various form. For example, if the order ID is a sequential number, the exchange computer system can increment a counter, and use the counter value as the order ID. If the order ID is unique to the client, then the exchange computer system can use the client ID to determine the most recent order ID used by the client, and increment that value to produce an updated most recent order ID for the client (storing the new value for later use), then use the most recent order ID as a component of the order ID. The exchange computer system can then combine (e.g., concatenate) the client ID and the most recent order ID to form the unique order ID. In some implementations, the exchange computer system appends a checksum to the order ID. In some implementations, the exchange computer system produces an error correcting code from the order ID, then uses the error correcting code as the order ID.

The exchange computer system tags (220) the order with the order ID. In some implementations, the exchange computer system adds the order ID to the data structure containing the order. In some implementations, the exchange computer system adds a reference to the order ID to a data structure containing the order. In some implementations, the exchange computer system creates an association between the reference to the order ID and a data structure containing the order. For example, the exchange computer system can maintain a table (e.g., in a database) that contains references to orders and either order IDs or references to order IDs.

The exchange computer system conducts (225) an operation related to the order. As described in reference to FIG. 1, operations can include various operations, including but not limited to, routing the order to an exchange or device, receiving a bid for an offer, receiving modifications to an existing order, canceling an order, or completing the order exchange computer system. The exchange computer system can store (e.g., in storage included in the exchange computer system), a description of the operation, and the description can include the type of operation, the resource assigned to the operation, and the status.

In some implementations, when the operation includes open outcry trading, the exchange computer system can transmit a message to an open outcry source requesting that the open outcry source provide data indicative of the operation. The data can include an image or video associated with the order. For example, if the operation includes fulfilling an order, the request can specify that video of the fulfillment should be provided. In some implementations, the open outcry source can provide a reference (e.g., a URL) to a live feed of the operation. The exchange computer system can transmit the message when the order is routed to the open outcry source.

In some implementations, when the exchange computer system requests data indicative of the operation, the open outcry source can begin an image capture and/or livestreaming in response to receiving the request. In some implementations, the open outcry source can cease capturing and/or livestreaming video in response to an indication that the operation completed. In some implementations, the open outcry source can cease capturing and/or livestreaming video after a configured period of video capture. The configured period can reflect the longest duration required to complete the operation, optionally with a small additional duration (e.g., 10 seconds, 30 seconds and one minute) added to capture any activity that occurs after the operation has completed.

In some implementations, the open outcry source can use speech recognition to determine when to begin video capture. In response to receiving an order, the open outcry source can configure a voice recognition engine to search for the order number and/or to search for other spoken language related to the order (e.g., the transacting party). The speech recognition system can receive audio data captured by microphones, and perform speech recognition on the audio captured by each microphone. In some implementations, audio can be captured by devices (e.g., mobile phones) worn or carried by persons in the open outcry area. Such data can be used in addition to, or instead of, audio data captured by microphones in the open outcry source. Upon recognizing the language, the open outcry source can begin video livestream and/or video capture. The open outcry source can cease video livestream and/or capture upon recognizing speech that indicates completion of the transaction and/or after a configured period of time.

In some implementations, the open outcry source can store video captured during the completion of an operation. The open outcry source can store the video from the time period during which the operation occurred on a storage system (e.g., block store or file system configured to store video). The open outcry source can further store order ID (or alternative indicator of the order) and a reference to the stored video, for example, in a database table that include rows for each operation and columns at least for the order ID and a reference to the stored video.

In some implementations, the open outcry source can store all video from the open outcry floor, and store, for at least some orders, the order ID (or alternative indicator of the order), a reference to the location in stored video at which time the order with the order ID occurred, a duration of the operation and (optionally) other descriptive information. Then, in response to a request for the video that includes the order ID, the open outcry source can query the database using the order ID to determine the time at which the operation occurred and the duration of the operation. The open outcry source can then provide the portion of the video that begins at the time the open occurred through the duration of the operation. In some implementations, the open outcry server can provide video for a configured period before and/or after the operation occurred.

The exchange computer system determines (230) an order status, which can include the stage of the order execution. As described above, stages of order execution can include received, entered in order book, routed to exchange, cancelled, and fulfilled.

The exchange computer system can determine the resource assigned to perform the most recent operation (which was stored in operation 225). The exchange computer system can then query that resource to determine status. For example, if the resource assigned to perform the operation was a different exchange, the exchange computer system can query that exchange (e.g., by calling an API provided by that exchange) to determine an order status. In another example, if the operation was perform by the exchange computer system, the exchange computer system can determine the status from the information stored in operation 225. In some implementations, the resource performing the operation can transmit a status message to the exchange computer system, and the exchange can receive the status message and determine the status from the message using convention message parsing techniques. In some implementations, the exchange computer system can store the status, for example, on a storage device that is part of the exchange computer system.

In some instances, data provided by a resource will not match the data format required by the exchange computer system and the exchange computer system can perform data adaptation. For example, if the data are encoded as XML, and the schema used by the resource does not match the schema used by the exchange computer system, the exchange computer system can perform a schema-to-schema transformation. In some implementations, the exchange computer system can include schema transformation rules that define mapping from the schemas used by other resources and the schema used by the exchange computer system. For example, a rule can include the name of the resource, the name of a schema element used by the resource, and a target element in the exchange computer system schema. When the exchange computer system encounters an element in a data item from a resource, the exchange computer system can retrieve the rule associated with the element (that is, the rule in which the name of the resource in the rule matches the name of the resource and the name of the element in the rule matches the name in the element provided by the resource), and replace the element name in the data item with the element name specified by the rule. In some implementations, the rule can also specify data conversions. For example, the schema for an element might specify that the unit is thousands of items (e.g., if the item value is 10, that indicates 10,000 items) and the schema for the exchange computer system might specify that the unit is the number of items. In such cases, the exchange computer system can convert the element value according to the rule. In the example given above, the value (i.e., "10") would be replaced with the value multiplied by one thousand (i.e., "10,000").

The exchange computer system stores (235) the order status, which can include the order stage. The exchange computer system can write the order status to local (i.e., storage that is part of the exchange computer system) or remote storage, to a local or remote database, or other data storage systems using conventional data storage techniques.

The exchange computer system receives (240) an order request. The order request can include information from which the exchange computer system can determine order status. For example, the order request can include, without limitation and in any combination, the client ID, a client username and an order identifier.

Figure 6:
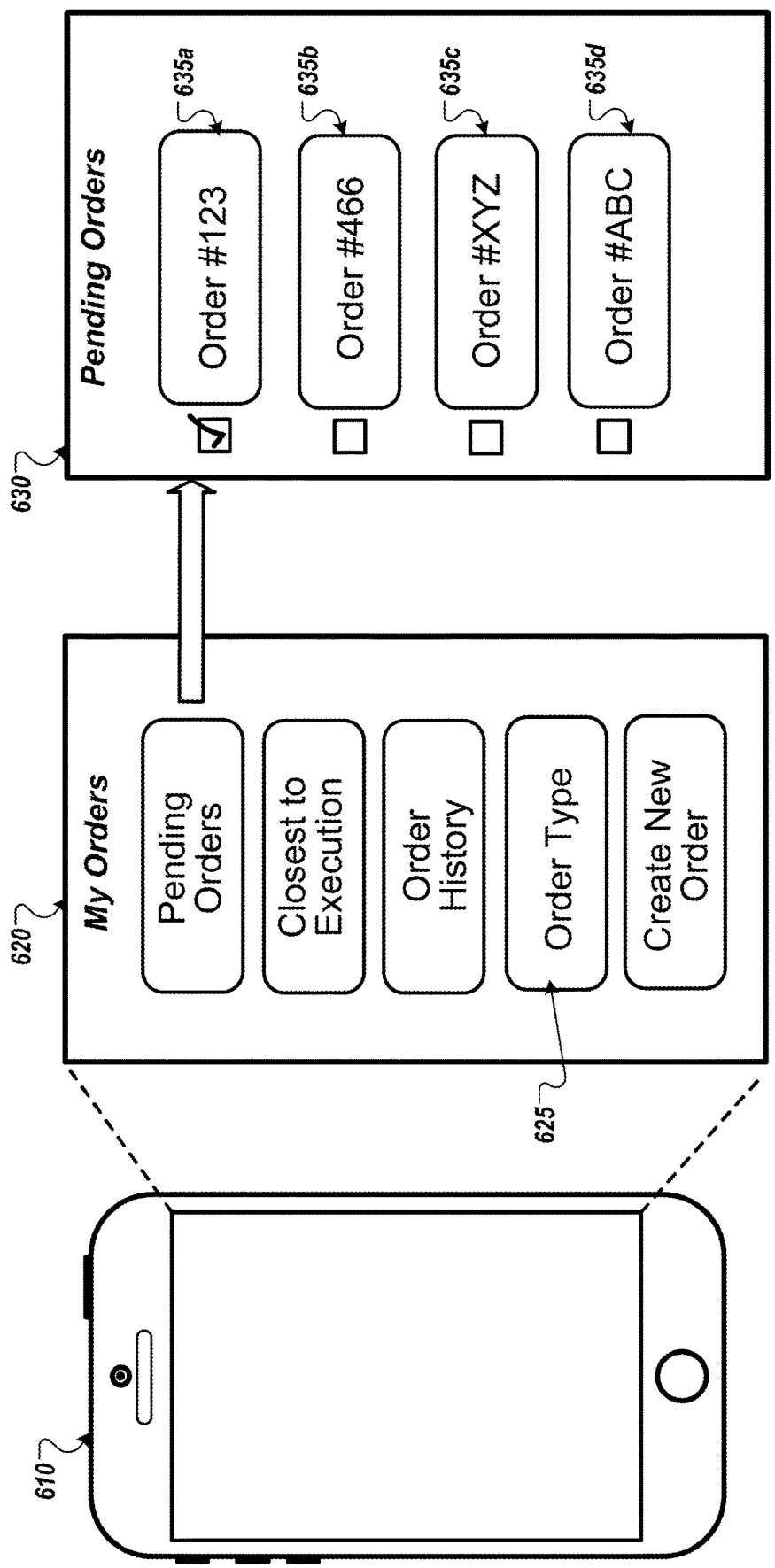
FIGS. 6-12 are illustrations of user interfaces for order tracking.

In some implementations, the order request can be received in response to the user interacting with user interface presentation data provided by the exchange computer system to the user's device. For example, FIG. 6 shows a sample user interface for order tracking. When rendered by a user device 610, user interface presentation data can cause the user device to display a user interface panel 620 that allows a user to select among various status request types. Status request types can include pending order, the order closest to execution, order history and so on. When a user selects the order type option 625 by interacting with the user interface presentation data, the user interface presentation data can enable the user to sort the data based whether the order is, for example, for options, future, or stock—or for Limit, Market, Stop-Loss and GTC.

When a user selects a "pending orders" operation, the user interface presentation data can cause the user device 610 to display a second interface panel 630. The second panel 630 can display a list of pending orders (e.g., retrieved from the exchange computer system) and allow the user to select one or more pending orders. User interface presentation data associated with the second panel 630 can cause a request to be transmitted to the exchange computer system indicating the order(s) for which status is requested.

In some implementations, the exchange computer system can include a machine-learning model to predict orders that are likely to be of interest to the user. For instance, one or more neural networks can accept, as training data input, order entries made by the user or order status inquiries made by the user. Based on the training data derived from user inputs and inquiries, the neural networks may determine the types of orders that the user most frequently places or inquires about and build a profile for the user. In the profile, the neural networks can keep track of the types of orders the user is most frequently interested in and rank the types of orders. The exchange computer system can then determine other orders that match the types of orders of interest to the user, and provide data for the matching orders to the user device as user interface presentation data. Such orders may have a high probability to be of user interest. The user interface presentation data, when rendered by the user device, causes the user device to display the orders with the highest predicted user interest. For example, the exchange computer system can produce user interface presentation data for the panel 630 that includes entries 635*a*, 635*b*, 635*c*, 635*d* corresponding to the orders that are most likely of interest. In some implementations, the entries can be ordered such that the entry corresponding to the order with highest predicted interest is displayed in a prominent location (e.g., at the top) of the display screen of the user device, and entries corresponding to orders with decreasing predicted interest can be displayed in decreasing order of prominence.

Orders that are predicted to be of interest through machine learning can be displayed in a separate window or mode such that the user can be provided with an option to view other orders that may be of interest to the user in a separate window from the orders that the user is tracking or has inquired about. In addition, the neural networks can also track user interactions with the orders that are likely to be of interest to the user. For instance, if one type of order is repeatedly presented to the user but is not selected by the user for viewing further information and a second type of order is repeatedly presented to the user and is selected by the user for viewing further information multiple times, the neural networks may determine that the second type of order is of greater interest to the user.

Figure 7:
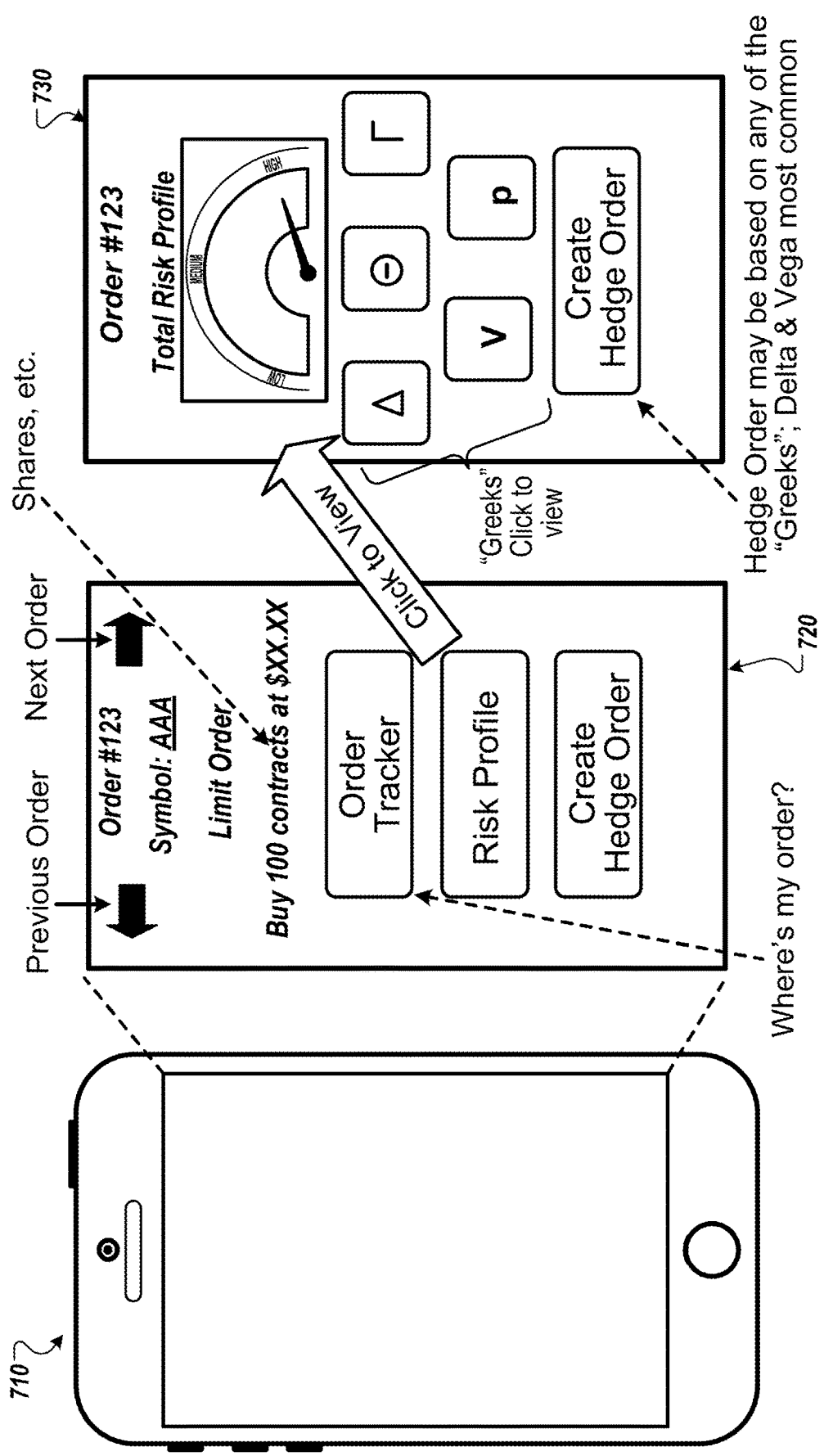

FIG. 7 shows a sample user interface for order tracking. When rendered by a user device 710, user interface presentation data can cause the user device to display a user interface panel 720 that displays options related to an order. For example, the user interface panel 720 can show the order number, the symbol, the type of order, and so on. In addition, the user interface panel 720 can include various options including tracking an order, showing a risk profile and creating a hedge order. In response to a user indicating, through an interaction with user interface presentation data provided by the exchange computer system, interest in a risk profile, the user interface presentation data can cause the client device 710 to display a second user interface panel 730 that shows the risk profile. The second user interface panel 730 can include a button, which when selected by the user, causes the user device 710 to display various information related to the risk, and parameters for creating a hedge order such as delta, theta, vega, and gamma.

Figure 8:
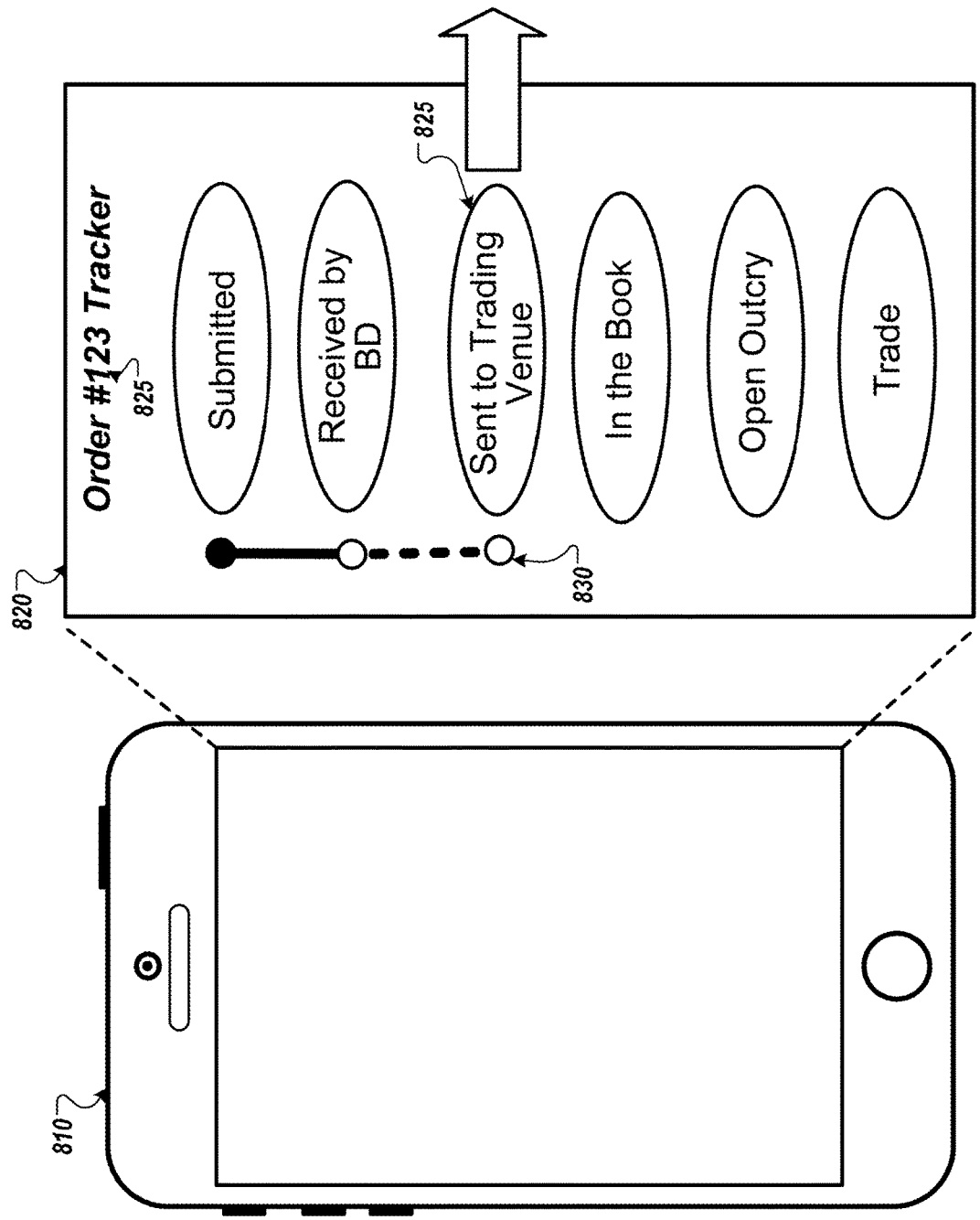

FIG. 8 shows a sample user interface for order tracking. When rendered by a user device 810, user interface presentation data can cause the user device to display a user interface panel 820 that displays the order status for a particular order, as indicated by the order number 825. The status can be indicated, for example, by a status bar 830 in which filled circle represent completed phased of the order. User interface presentation data associated with "send to trading venue" option 825 can include visuals for initial and subsequent trading venues, e.g., "routed to Exchange X.".

Figure 9:
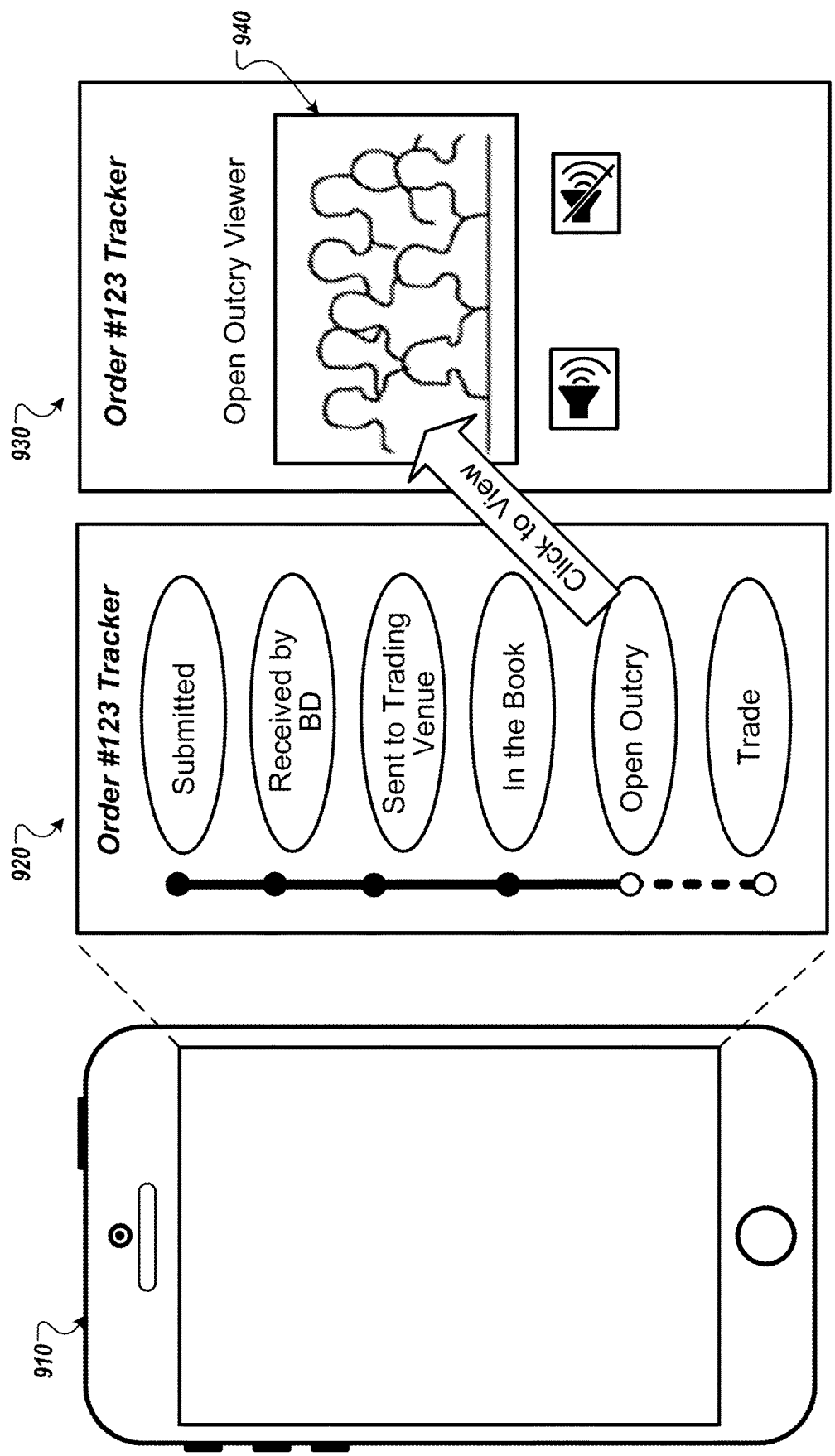

FIG. 9 shows a sample user interface for order tracking. When rendered by a user device 910, user interface presentation data can cause the user device to display a user interface panel 920 that displays the order status (e.g., as described with reference to element 820 of FIG. 8). The user interface presentation data can include the description of a second panel 930, which shows image data of a live or recorded view of an open outcry trading floor during the time the order is being filled. Thus, a user can watch, in real-time or as recorded video, trader actions and transactions associated with the user order. The image data can be provided by an open outcry source and can include video images (2D or 3D), still images and audio in any combination. In some implementations, the user interface presentation data can use various indicators such as sound, color and size to indicate status of an order. For example, immediately after an operation occurs, the outcry widget 940 within the panel 930 can be enlarged in size and outlined in a prominent color (e.g., bright green). In another example, immediately after an operation occurs, the user interface presentation data can cause the user device 910 to issue a tone (e.g., a beep).

Figure 10:
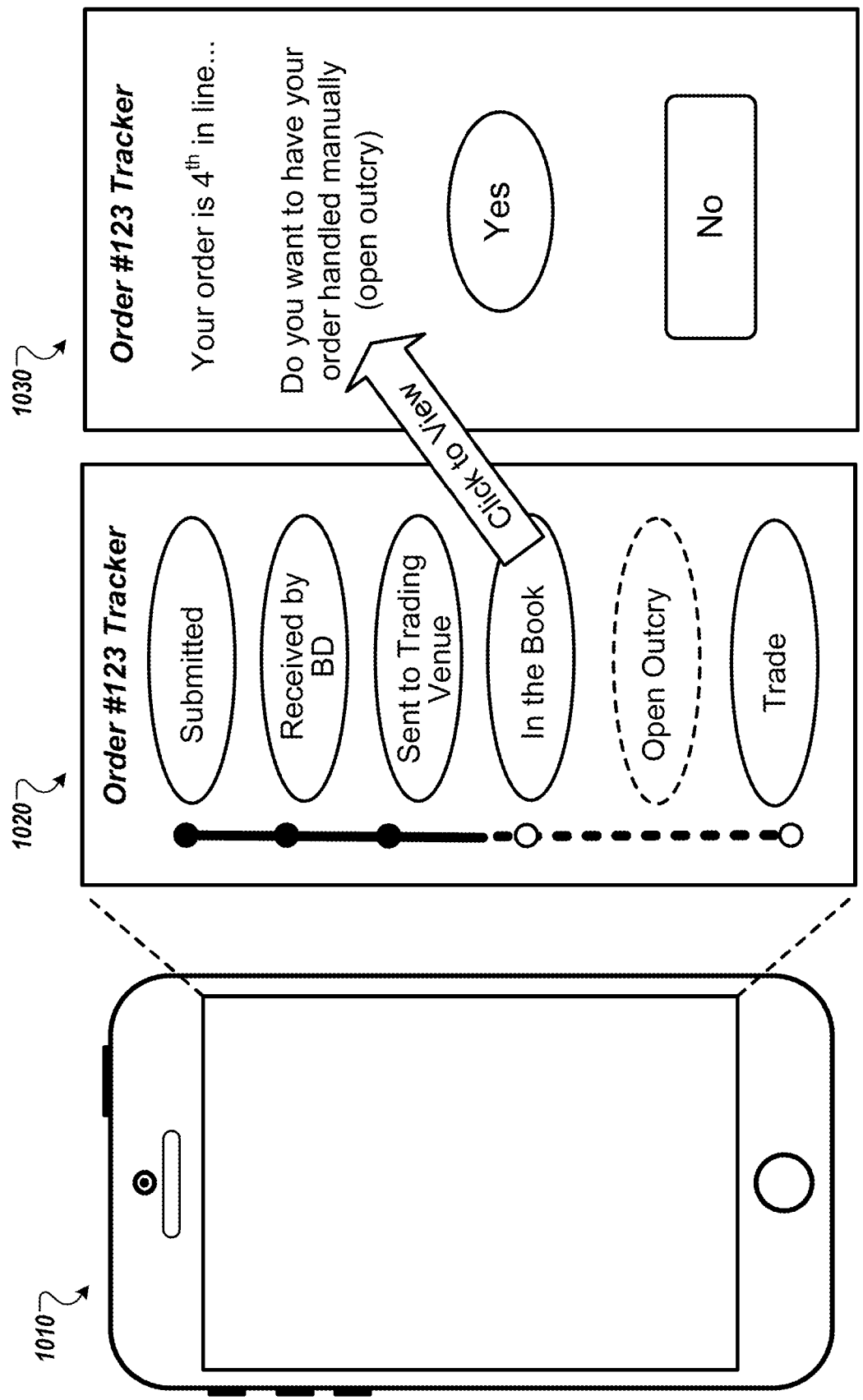

FIG. 10 shows a sample user interface for order tracking. When rendered by a user device 1010, user interface presentation data can cause the user device to display an order tracker panel 1020. When a user selects an "in the book" order status, the user interface presentation data causes the user device 1010 to display a second user interface panel 1030 showing the queue position of the order. In this example, the order is fourth in line. The user interface panel 1030 also includes a button, that, when pressed, causes the user interface presentation data to send a message to the exchange computer system indicating that the order should be handle manually—i.e., using open outcry.

Figure 11:
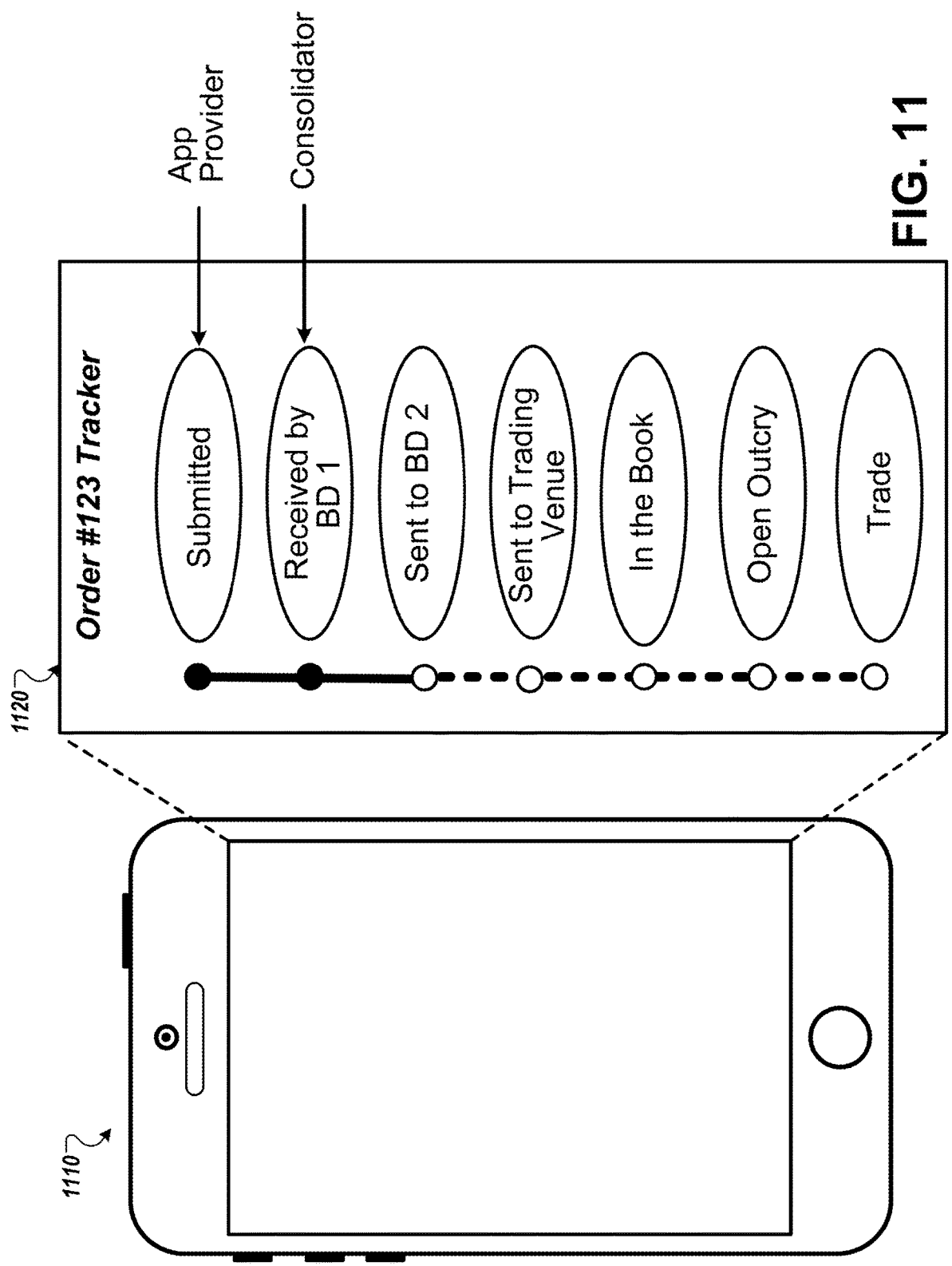

FIG. 11 shows a sample user interface for order tracking. When rendered by a user device 1110, user interface presentation data can cause the user device to display a user interface panel 1120 that shows the order status. In the interface panel 1120, the order has been received by a first broker-dealer, which is acting as a consolidator, and is in the process of being sent to a second broker-dealer.

Figure 12:
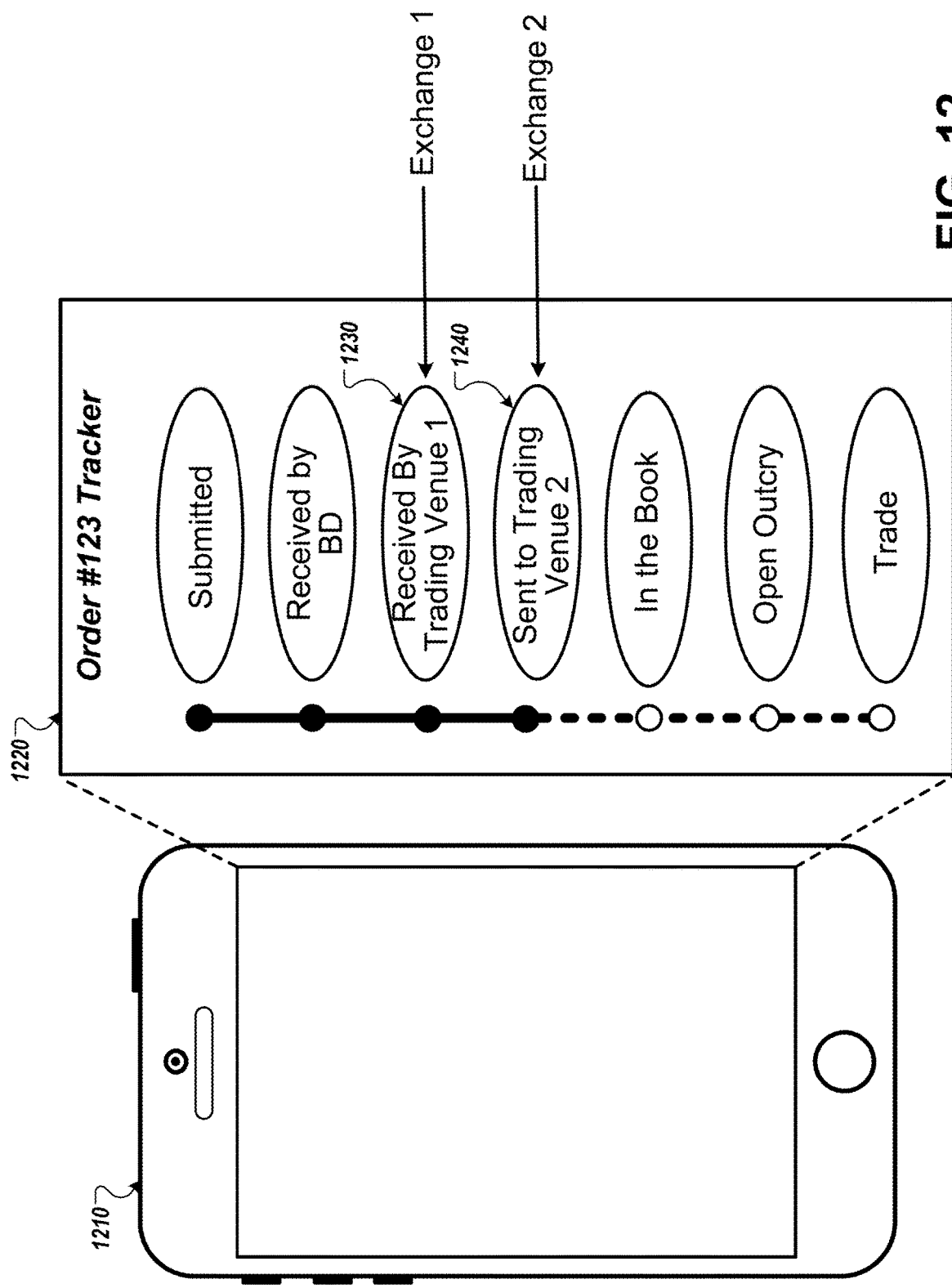

FIG. 12 shows a sample user interface for order tracking. When rendered by a user device 1210, user interface presentation data can cause the user device to display a user interface panel 1220 that shows the order status. In the interface panel 1220, a status indicator 1230 shows the order has been received by a first trading venue and a second status indicator 1240 shows that the order has been sent to a second trading venue. When the exchange computer system receives a message indicating that the second venue has received the message, exchange computer system can update the user interface presentation data causing the second status message 1240 to change to "order received." In some implementation, the exchange computer system can update the user interface presentation data to indicate "order received status" after the passage of a configured period of time.

Returning to FIG. 2, the exchange computer system obtains (245) the status of the order, including the stage for the order, identified by the order request. The process of operation can employ the same or similar operations as the operations of 230.

As described in reference to FIG. 9, the status of the order can include live or recorded video of the order being processed or fulfilled. For example, the order status can include a reference (e.g., a Uniform Resource Locator (URL)) to a live video feed of an open outcry trading session at which the order will be fulfilled. In response to receiving user interface presentation data (or other data received from the exchange computer system) containing the URL, the client device can display the live video. In another example, the order status can include a reference (e.g., a URL) to a storage location containing live video of the fulfillment.

The exchange computer system transmits (250) tracking data that includes the stage of order execution for the order. The exchange computer system can transmit the tracking data using any appropriate data transmission protocol. For example, the exchange computer system can transmit the data using HTTPS or using Secure Sockets Layer (SSL) transport.

Figure 13:
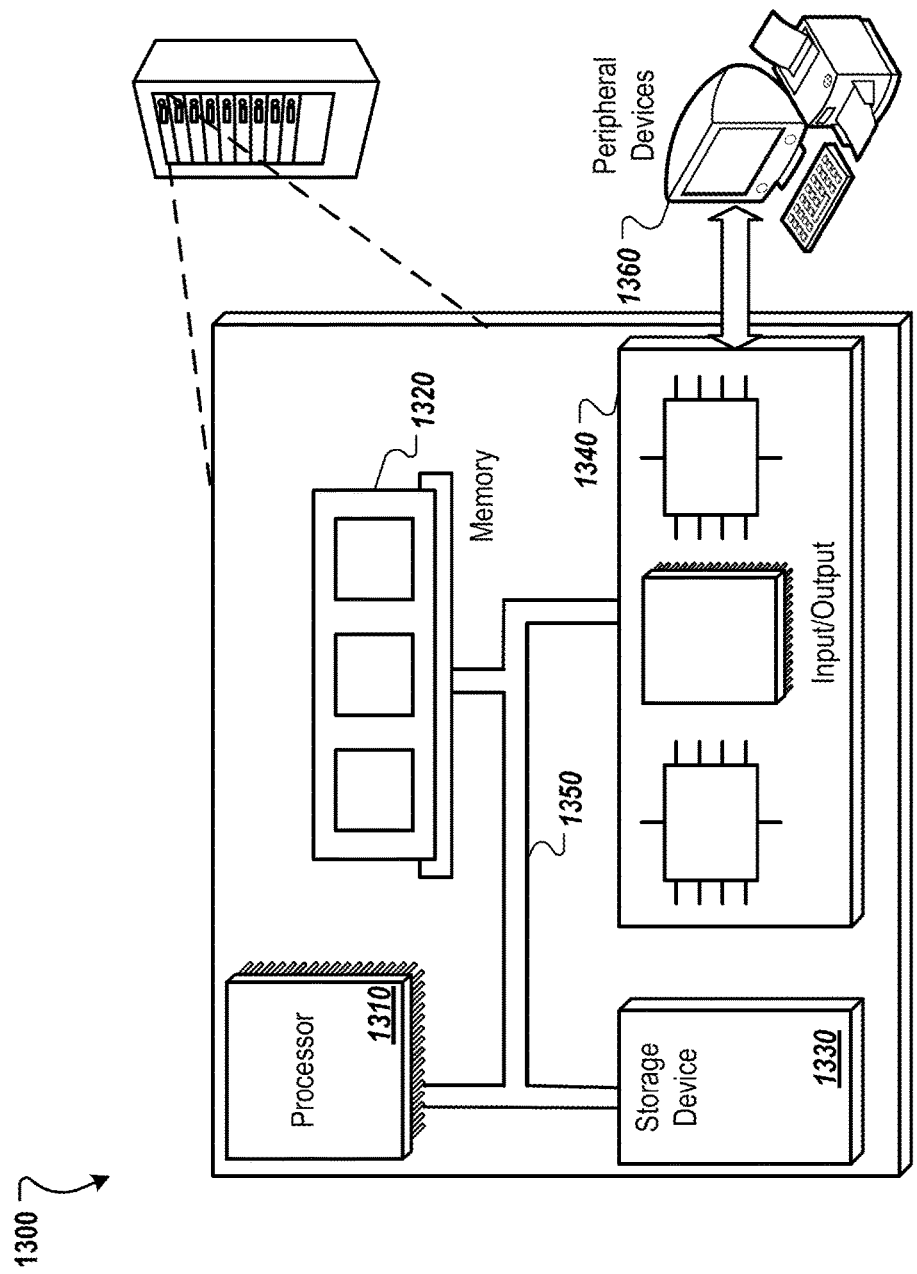
FIG. 13 is a block diagram of an example computer system.

FIG. 13 is a block diagram of an example computer system 1300 that can be used to perform operations described above. The system 1300 includes a processor 1310, a memory 1320, a storage device 1330, and an input/output device 1340. Each of the components 1310, 1320, 1330, and 1340 can be interconnected, for example, using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330.

The memory 1320 stores information within the system 1300. In one implementation, the memory 1320 is a computer-readable medium. In one implementation, the memory 1320 is a volatile memory unit. In another implementation, the memory 1320 is a non-volatile memory unit.

The storage device 1330 is capable of providing mass storage for the system 1300. In one implementation, the storage device 1330 is a computer-readable medium. In various different implementations, the storage device 1330 can include, for example, a hard disk device, an optical disk device, a storage device that is shared over a network by multiple computing devices (e.g., a cloud storage device), or some other large capacity storage device.

The input/output device 1340 provides input/output operations for the system 1300. In one implementation, the input/output device 1340 can include one or more of a network interface devices, e.g., an Ethernet card, a serial communication device, e.g., and RS-2132 port, and/or a wireless interface device, e.g., and 802.11 card. In another implementation, the input/output device can include driver devices configured to receive input data and send output data to other input/output devices, e.g., keyboard, printer and display devices 1370. Other implementations, however, can also be used, such as mobile computing devices, mobile communication devices, set-top box television client devices, etc.

Although an example processing system has been described in FIG. 13, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed for execution on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computing device capable of providing information to a user. The information can be provided to a user in any form of sensory format, including visual, auditory, tactile, or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular implementations of the disclosed subject matter. Certain features that are described in this specification in the context of separate implementations can also be implemented in combination in a single implementation. Conversely, various features that are described in the context of a single embodiment can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Thus, unless explicitly stated otherwise, or unless the knowledge of one of ordinary skill in the art clearly indicates otherwise, any of the features of the implementations described above can be combined with any of the other features of the implementations described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A method for tracking an order and visualizing the order being executed via an exchange computer system, the method comprising:
   receiving, from a user device over a computer network coupled to the exchange computer system, the order;
   transmitting, by a transceiver of the exchange computer system to the user device over the computer network, order status data for the order such that a first graphical user interface (GUI) is provided on the user device to display a list of status indicators and a status bar for the order, wherein the list of status indicators are stacked according to respective stages of the order being executed via the exchange computer system, and wherein the status bar shows a live progression through the respective stages;
   receiving, from the user device, a request for a video reference for a video file of open outcry trading related to the order, the user device sending the request for the video reference to the exchange computer system over the computer network responsive to user input selecting a status indicator from the list of status indicators;
   obtaining, from an order tracking system, the video reference of the order being executed, the video reference identifying a location on the computer network of a video file generated via a recording of the open outcry trading responsive to detection of a sound by one or more microphones of a verbal indication of the order; and
   transmitting, by the transceiver and to the user device over the computer network, the video reference such that a second graphical user interface (GUI) is provided on the user device to display the video file, wherein the video file is transmitted by the computer network to the user device without routing the video file through the exchange computer system.

2. The method of claim 1, wherein the exchange computer system comprises:
   an order routing system;
   an order matching system; and
   the order tracking system.

3. The method of claim 2, further comprising:
   determining, by the order routing system, that the exchange computer system is an order destination;

forwarding the order from the order routing system to the order matching system; and facilitating, by the order matching system, a transaction based on the order, one or more responses to the order, and one or more order matching rules; and wherein the order tracking system determines that the order has been executed in response to completion of the transaction.

4. The method of claim 1, wherein the order comprises a symbol, an order type, and an order amount.

5. The method of claim 1, wherein the video file is transmitted by the computer network to the user device as the video file is being created to provide the user device with a live view of the open outcry trading.

6. The method of claim 1, wherein the video file is transmitted by the computer network to the user device after the video file is created to provide the user device with a recorded view of the open outcry trading after the open outcry trading has completed.

7. The method of claim 1, wherein the video file comprises a plurality of recordings of the open outcry trading captured by a plurality of cameras operating simultaneously.

8. The method of claim 1, wherein the video file further comprises time stamps for events that occur at the open outcry trading.

9. An exchange computer system comprising:

an order entry point configured to receive, from a user device over a computer network coupled to the exchange computer system, an order;

a transceiver configured to:

transmit, to the user device over the computer network, order status data for the order such that a first graphical user interface (GUI) is provided on the user device to display a list of status indicators and a status bar for the order, wherein the list of status indicators are stacked according to respective stages of the order being executed via the exchange computer system, and wherein the status bar shows a live progression through the respective stages;

receive, from the user device, a request for a video reference for a video file of open outcry trading related to the order, the user device sending the request for the video reference to the exchange computer system over the computer network responsive to user input selecting a status indicator from the list of status indicators; and obtaining, from an order tracking system, the video reference of the order being executed, the video reference identifying a location on the computer network of a video file generated via a recording of the open outcry trading responsive to reception of a recording request and recording for a pre-determined amount of time; and transmit, to the user device, the video reference such that a second graphical user interface (GUI) is provided on the user device to display the video file, wherein the video file is transmitted by the computer network to the user device without routing the video file through the exchange computer system.

10. The exchange computer system of claim 9, further comprising an order routing system, and an order matching system, wherein:

the order routing system is configured to:

(i) determine that the exchange computer system is an order destination; and (ii) forwarding the order to the order matching system;

the order matching system is configured to facilitate a transaction based on the order, one or more responses to the order, and one or more order matching rules; and the order tracking system is configured to determine that the order has been executed in response to completion of the transaction.

11. The exchange computer system of claim 9, wherein the order comprises a symbol, an order type, and an order amount.

12. The exchange computer system of claim 9, wherein the video file is transmitted by the computer network to the user device as the video file is being created to provide the user device with a live view of the open outcry trading.

13. The exchange computer system of claim 9, wherein the video file is transmitted by the computer network to the user device after the video file is created to provide the user device with a recorded view of the open outcry trading after the open outcry trading has completed.

14. The exchange computer system of claim 9, wherein the video file comprises a plurality of recordings of the open outcry trading captured by a plurality of cameras operating simultaneously.

15. The exchange computer system of claim 9, wherein the video file further comprises time stamps for events that occur at the open outcry trading.

16. One or more non-transitory computer-readable storage media storing instructions that when executed by a computer in an exchange computer system cause the computer to perform operations comprising:

receiving, from a user device over a computer network coupled to the exchange computer system, an order;

controlling a transceiver of the exchange computer system to transmit, to the user device over the computer network, order status data such that a first graphical user interface (GUI) is provided on the user device to display a list of status indicators and a status bar for the order, wherein the list of status indicators are stacked according to respective stages of the order being executed via the exchange computer system, and wherein the status bar shows a live progression through the respective stages;

receiving, from the user device, a request for a video reference for a video file of open outcry trading related to the order, the user device sending the request for the video reference to the exchange computer system over the computer network responsive to user input selecting a status indicator from the list of status indicators;

obtaining, from an order tracking system, the video reference of the order being executed, the video reference identifying a location on the computer network of a video file generated via a recording of the open outcry trading responsive to detection of a sound by one or more microphones of a verbal indication of the order; and controlling the transceiver of the exchange computer system to transmit, to the user device over the computer network, the video reference such that a second graphical user interface (GUI) is provided on the user device to display the video file, wherein the video file is transmitted by the computer network to the user device without routing the video file through the exchange computer system.

17. The one or more non-transitory computer-readable storage media of claim 16, wherein the video file is transmitted by the computer network to the user device as the video file is being created to provide the user device with a live view of the open outcry trading.

18. The one or more non-transitory computer-readable storage media of claim 16, wherein the video file is transmitted by the computer network to the user device after the video file is created to provide the user device with a recorded view of the open outcry trading after the open outcry trading has completed.

19. The one or more non-transitory computer-readable storage media of claim 16, wherein the video file comprises a plurality of recordings of the open outcry trading captured by a plurality of cameras operating simultaneously.

20. The one or more non-transitory computer-readable storage media of claim 16, wherein the video file further comprises time stamps for events that occur at the open outcry trading.

* * * * *